United States Patent

Lysbo et al.

[11] Patent Number: 5,419,738
[45] Date of Patent: May 30, 1995

[54] METHOD AND AN APPARATUS FOR CUTTING FREE AND REMOVING THE RECTUM OF A CARCASS OF A SLAUGHTERED ANIMAL, PREFERABLY PIGS

[75] Inventors: Bettina L. Lysbo; Borge C. Andersen, both of Vaerlose, Denmark

[73] Assignee: Chickmatic Aps v/Borge Christian Andersen, Denmark

[21] Appl. No.: 98,262

[22] PCT Filed: Feb. 6, 1992

[86] PCT No.: PCT/DK92/00038

§ 371 Date: Nov. 3, 1993

§ 102(e) Date: Nov. 3, 1993

[87] PCT Pub. No.: WO92/13458

PCT Pub. Date: Aug. 20, 1992

[30] Foreign Application Priority Data

Feb. 6, 1991 [DK] Denmark ................. 0198/91

[51] Int. Cl.6 ............................................. A22B 5/00
[52] U.S. Cl. ................................... 452/122; 452/120
[58] Field of Search ............... 452/122, 109, 120, 152

[56] References Cited

U.S. PATENT DOCUMENTS

| | | | |
|---|---|---|---|
| 4,087,886 | 5/1978 | Aubert | 452/122 |
| 4,564,977 | 1/1986 | Scheier et al. | 452/122 |
| 5,041,053 | 8/1991 | Ellis et al. | 452/120 |
| 5,112,272 | 5/1992 | Andersen | 452/122 |
| 5,120,266 | 6/1992 | Aubert | 452/120 |
| 5,123,871 | 6/1992 | van den Nieuwelarr et al. | 452/122 |
| 5,141,471 | 8/1992 | Bekkers | 452/122 |
| 5,199,922 | 4/1993 | Korenberg et al. | 452/122 |

FOREIGN PATENT DOCUMENTS 129495 10/1974 Denmark .
156808 12/1976 Denmark .

Primary Examiner—Willis Little
Attorney, Agent, or Firm—Vande Sande & Priddy Pollock

[57] ABSTRACT

A method of cutting free and removing a rectum of a carcass of a slaughtered animal hanging by the hind legs with a head downwardly. An apparatus including a rotating tubular knife is positioned in the vicinity of the rectum of the carcass. A guiding pin on the apparatus is inserted into the rectum of the carcass coaxially with a main axis of the rectum. The guiding pin is arranged coaxial with the rotating tubular knife. The rotating tubular knife is moved into the carcass coaxially with the main axis of the rectum, thereby cutting the rectum free of the carcass. The rectum is retained in the rotating tubular knife. The rectum is pulled free of the carcass toward a ventral side of the carcass in a direction substantially perpendicular to a main axis of the carcass. The rectum is hung downwardly over a side of a protective shield. The side of the shield faces away from the carcass.

18 Claims, 4 Drawing Sheets

METHOD AND AN APPARATUS FOR CUTTING FREE AND REMOVING THE RECTUM OF A CARCASS OF A SLAUGHTERED ANIMAL, PREFERABLY PIGS

FIELD OF THE INVENTION

The invention relates to a method of cutting free and removing the rectum of a carcass of a slaughtered animal, preferably a pig hanging on the hind legs with the head downwards, whereby the rectum is cut free by means of a rotating tubular knife being moved into the carcass from the back substantially coaxially with the center line of the rectum while being guided by means of a pin inserted in the rectum after being cut free, the rectum is retained by the knife and, thereby, pulled out of the carcass. The invention also relates to an apparatus for carrying out the above method.

BACKGROUND OF THE INVENTION

It is known, from DK-PS No. 156,808, to cut free the rectum, the so-called fatty end, of a carcass of a slaughtered animal by means of a rotating tubular drill or a rotating tubular knife, where the knife is placed opposite the rectum of the carcass in such a manner that the axis of rotation of the knife is placed in extension of the center line of the rectum and the spine of the carcass. Subsequently, the rotating drilling pipe is moved forward. The movement by the drill is guided by a pin placed in the tubular drill and inserted in the anus. According to DK-PS No. 156,808, the drill is removed after the cutting procedure.

Attempts at pulling out the rectum in extension of the center line thereof are also known, for example, DK-PS No. 129,495, in the rectum is retained outside the animal on the back of the carcass while the remaining intestinal portions are cut free. A condition for pulling out the rectum in extension of its center line is that the rectum is so resilient that it can be kept intact outside the carcass. It turned out, however, that the resilience of the rectum varies much from animal to animal, especially in connection with pigs. As a result, the rupture of the rectum often arises, particularly with sows.

Both when the rectum is left inside the carcass after the cutting procedure and when attempts are made at pulling out the rectum whereby the rectum ruptures, a risk exists of the visceral contents sieving out into the meat and thereby contaminating the meat. Contamination caused by sieving visceral contents in the latter process turned out to present severe problems of bacteria, such as Salmonella and Yersenia, in connection with meat from the bacon factories. Accordingly, the importance of avoiding in any possible way a sieving of visceral contents is recognized. The rectum cut free cannot therefore be left free in the carcass after the cutting free procedure. Nor should rupture of the rectum be allowed during attempts to pull it backwards relative to the hind part of the carcass and retain it in the drill until the remaining portion of the intestinal portions have been cut free. Although the remaining intestinal portions are cut free without causing any sieving of the visceral contents, a risk exists that some of the visceral contents nevertheless escape in connection with releasing the rectum from the drill.

SUMMARY OF THE INVENTION

Accordingly, it is the object of the invention to provide a method that, in a highly reliable manner, avoids all allowing contaminating visceral contents to escape during the slaughtering procedure.

The method according to the invention is characterized in that the rectum cut free is pulled out of the carcass in a direction substantially perpendicular to the length axis of the carcass towards the ventral side of the carcass while the ham is cut in two, in order to allow the rectum to be pulled forwards onto the ventral side. The rectum is subsequently left hanging downwardly over a side of a protecting shield facing away from the carcass.

This method avoids subjecting the rectum to a tension, which it cannot often stand up. In addition, the rectum is carried downwardly and left on a location where the visceral contents cannot come into contact with the carcass or the slaughterman. During the pulling out movement, the attachments usually resisting the pulling out of the rectum in a rearward direction are easily torn loose without thereby tearing apart the rectum.

The apparatus for carrying out the method comprises a tubular rotatable knife coaxially surrounding a pin and comprising a cutting edge at the front end. The rear end of the knife opposing the cutting edge is provided with means for providing a vacuum suction.

The apparatus according to the invention is characterized in that the pin is stationary, and that the inner side of the tubular knife and the outer side of the pin are provided with a thread being cut in opposite directions.

The resulting apparatus reliably ensures that the rectum will be cut free and retained during the pulling out movement because oppositely oriented threads on the rotating knife and the stationary pin pull the rectum in an efficient manner into the interior of the apparatus. The rectum is retained in the interior partly by means of a vacuum and partly by the engagement with the threads during the forward pulling to the protecting shield. The threads must, of course, be of such a shape that they do not tend to cut a hole in the rectum.

According to the invention, the inside shape of the tubular knife may have a conical transition portion narrowing away from the cutting edge and continuing into a cylindrical portion carrying the internal thread. The resulting squeezing of the rectum about the pin is very reliable at the same time as the effect of the vacuum is efficiently supported. The vacuum effect is additionally supported in an advantageous manner by the pin according to the invention being shaped with a conical transition portion expanding away from the free end of the pin and continuing into a cylindrical portion carrying the external thread.

Finally according to the invention, a fixed knife may be provided outside the tubular rotatable knife. The fixed knife automatically cuts the ham while the rectum, after being cut free, is being pulled out towards the ventral side of the carcass. Before the described apparatus is used, the abdomen of the carcass has been cut up in a conventional manner, and the carcass has been opened up to the inguinal bone, which has preferably also been cut through before the apparatus is used. After the rectum has been cut free, the ham need only be cut in two in order to allow the rectum to be pulled forwards onto the ventral side while being retained by the apparatus. The latter procedure is carried out in an easy and fast manner by means of the fixed knife. If desired, the inguinal bone can be cut simultaneously with the above procedure because the bone comprises a relatively easily cutable cartilage portion in the center thereof. The latter cutting requires, however, rather skilled slaughtermen.

BRIEF DESCRIPTION OF THE DRAWINGS

The invention is described in greater detail below with reference to the accompanying drawings, in which.

DESCRIPTION OF THE PREFERRED EMBODIMENTS OF THE INVENTION

Figure 1:
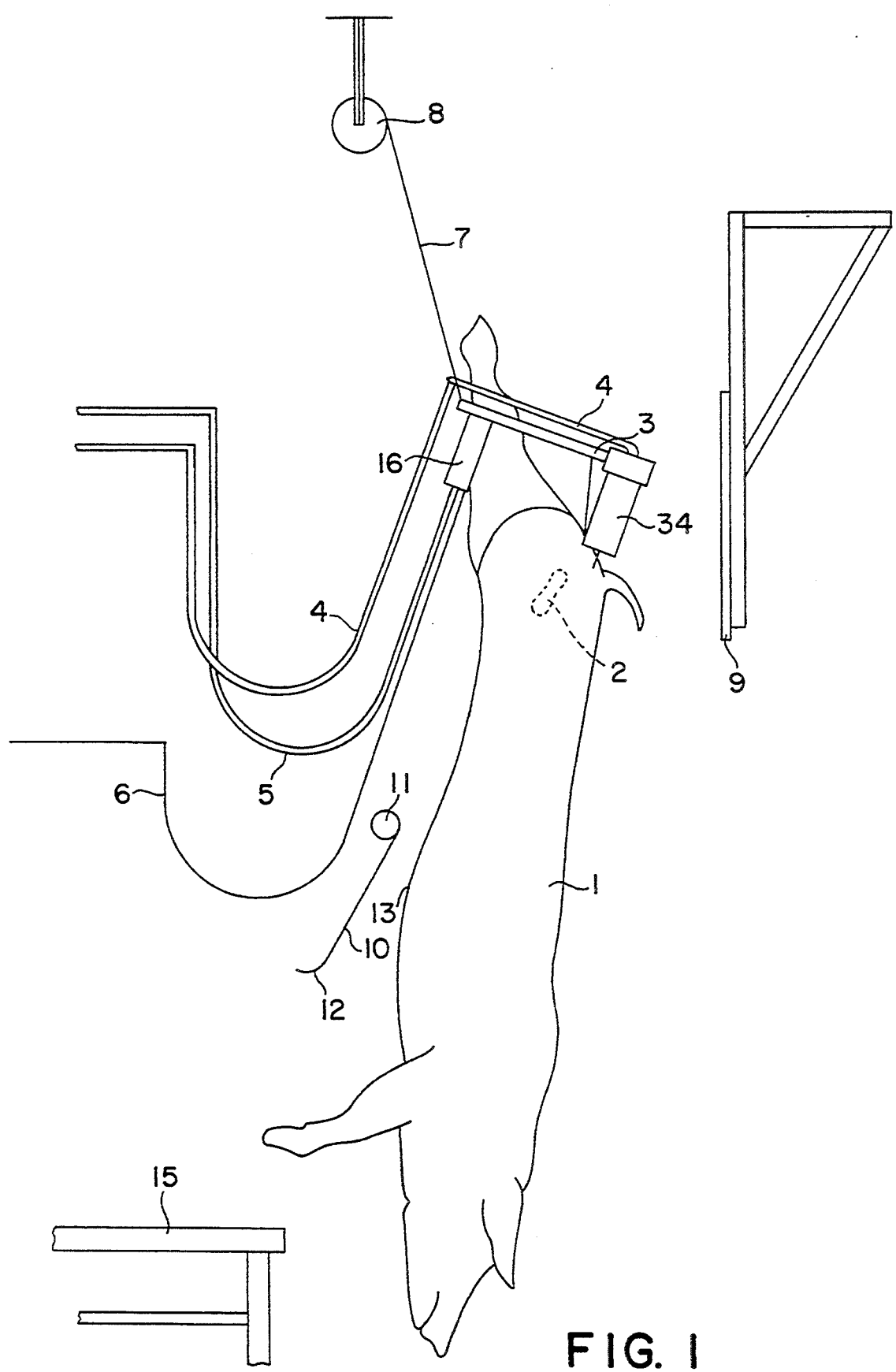
FIG. 1 is a diagrammatic view of a carcass of a slaughtered animal, the carcass being slung in the hind legs ready for having the rectum cut free in accordance with the present invention by means of a preferred embodiment of the apparatus according to the invention, one hind leg of the carcass is omitted for the sake of clarity.

The carcass of a slaughtered animal shown in FIG. 1 is a pig 1 ready for being subjected to a cutting free of the rectum. The abdomen of the carcass has been cut up in advance and opened to the inguinal bone 2, indicated by a dotted line in the drawing. The cutting free of the rectum is carried out by means of an apparatus 3 described in greater detail below. The apparatus 3 is connected to a hose 4 for the feeding of vacuum, pressurized air, hot water, and cold water, a hose 5 for pressurized air, as well as an electric wire 6. The apparatus 3 is slung in a line 7 being unwound from a storing spool 8. A mirror 9 is provided behind the carcass, opposite the hind portion of the carcass. The mirror is used by the slaughterman during the handling of the apparatus 3.

The rectum of the pig 1 is cut free opposite a platform 15 of such a height relative to the pig that the slaughterman can cut the rectum free at chest height. A protecting shield 10 is provided between the slaughterman and the pig 1. The shield extends obliquely downwards from a guide pipe 11 and comprising a drain 12 at the bottom.

Figure 2:
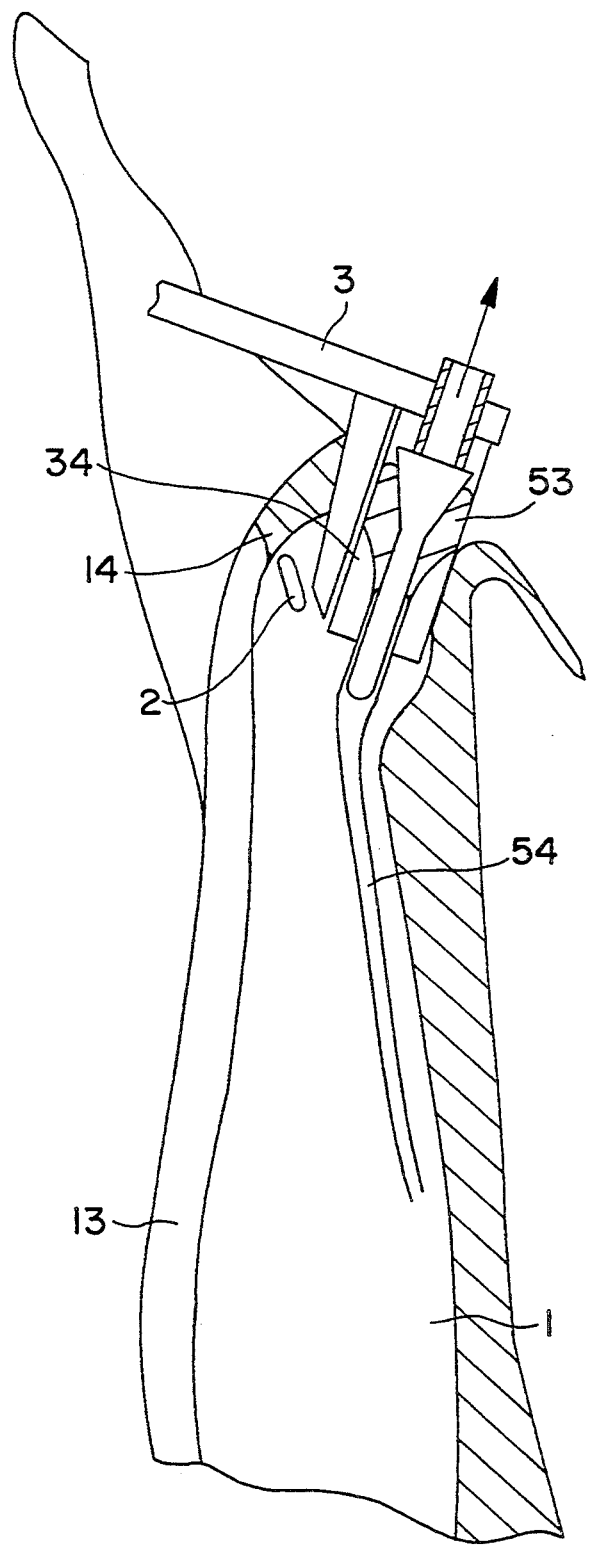
FIG. 2 is a diagrammatic sectional view on a larger scale of a portion of the carcass during the cutting free of the rectum, only part of the apparatus for cutting the rectum free is diagrammatically shown, partly in section.
Figure 3:
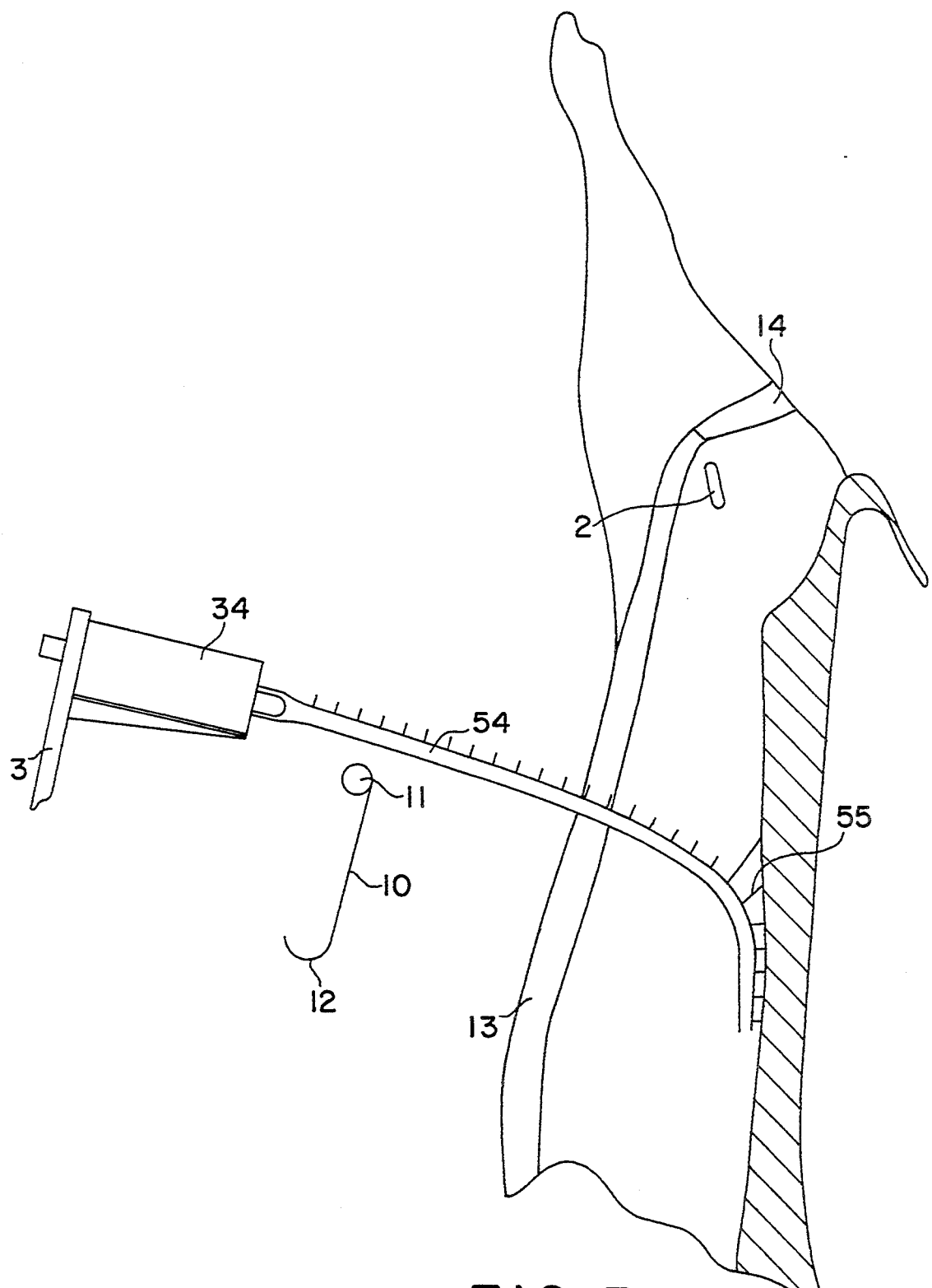
FIG. 3 corresponds to FIG. 2, but shows a method during the forward pulling of the rectum on the ventral side of the carcass.

Before the method according to the invention is initiated, the pig 1, slung in its hind legs, has been subjected to a slaughtering process ending with a cutting up of the abdomen, cf. the reference numeral 13 in FIGS. 2 and 3. The abdomen of the pig 1 slung up has been cut to the ham 14 between the hind legs of said pig, the ham abutting the rectum of the pig. In addition to the cutting of the abdomen 13, the inguinal bone 2 is also cut.

Figure 4:
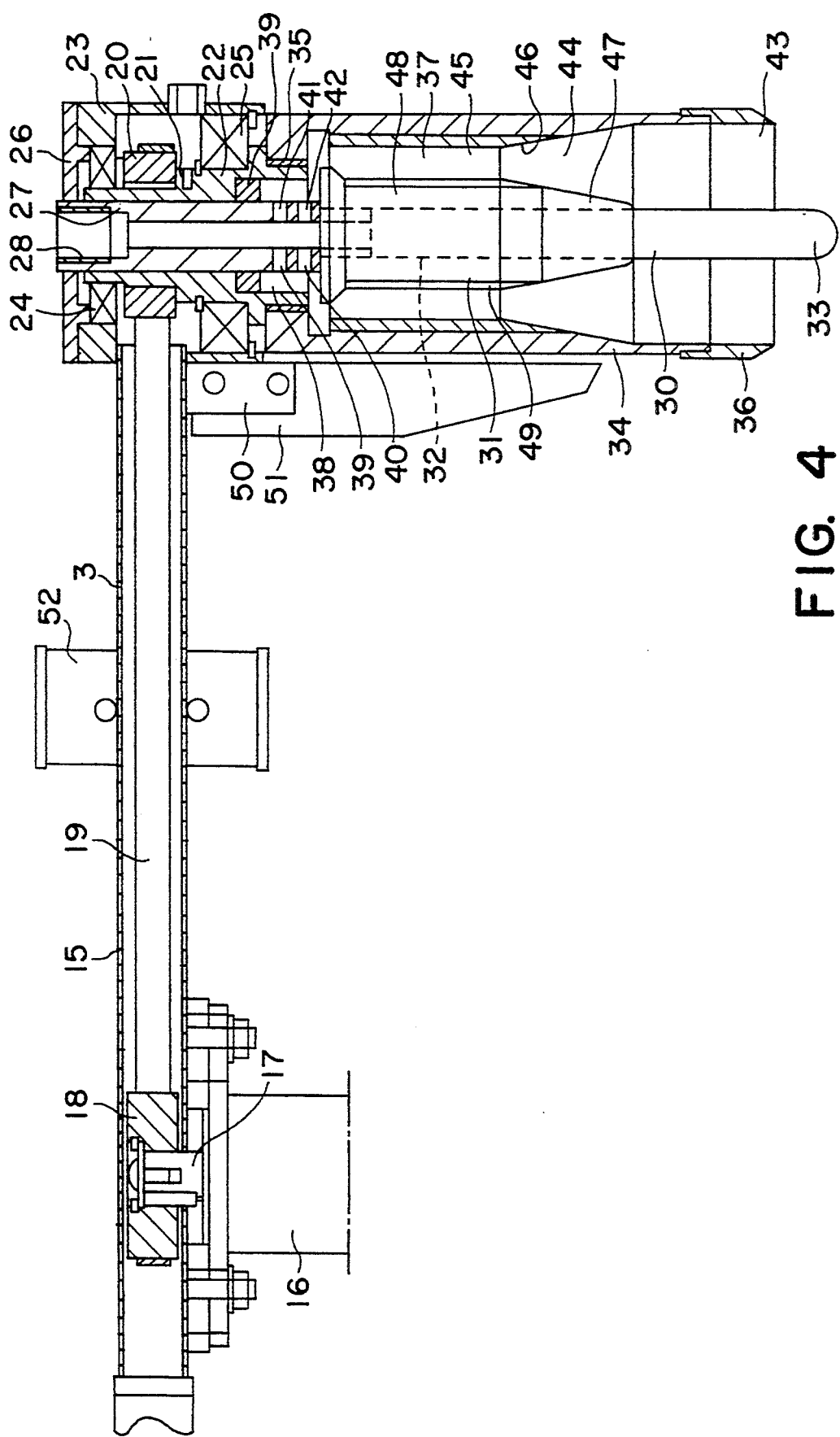
FIG. 4 is an axial, sectional view on a larger scale through the apparatus of FIG. 1, whereby parts have been omitted for the sake of clarity.

Subsequently, the cutting free of the rectum is initiated by means of the apparatus 3. As shown in FIG. 4, the apparatus comprises a carrying frame 15 carrying an air motor 16 at one end. The air motor is adapted to be driven by means of pressurized air fed through the hose 5, cf. FIG. 1. The air motor 16 comprises an output shaft 17 carrying a toothed pulley 18 arranged in the interior of the carrying frame 15. A toothed belt 19 extends about the toothed pulley. The toothed belt extends through the carrying frame 15 to the opposite end of the frame where it engages a driven toothed pulley 20. The toothed pulley 20 is permanently connected to a rotor 22 by means of a key 21. The rotor is rotatably journalled inside a substantially cylindrical bearing housing 23 by means of ball bearings 24 and 25. The bearing housing 23 is supported by and permanently connected to the carrying frame 15 in a manner not described in greater detail.

The bearing housing 23 is closed at one end by means of a cover 26. The cover 26 is centrally fixedly connected to a hollow shaft 27 coaxially extending through the rotor. The shaft 27 comprises at the end adjacent the cover 26 an internal thread 28 for the securing of the hose 4 for vacuum, pressurized air, and hot and cold water. The hollow shaft 27 extends, as mentioned, coaxially through the rotor 22 and is connected by means of an external thread to a stationary pin 30 arranged inside the apparatus. The pin 30 comprises an inner tubular part 31 of a circular cross section and with a through hole 32 provided with an internal thread. The inner part 31 of the pin, is at the inner end, screwed onto the hollow shaft 27 by means of the latter thread. The opposite end of the inner part is closed by means of a second, outer part 33 in the form of an annular solid bar provided with an external thread, which is to engage the thread in the through hole 32. The outer part 33 is smoothly rounded at the free end facing away from the inner part 31.

A tubular knife 34 is provided coaxially about the pin. The knife is, at one end, screwed fixedly onto the rotor 22 by means of co-operating threads 35. The tubular knife 34 carries a circular cutting edge 36 at the end opposite the rotor.

A free, rotationally symmetrical passage is provided about the pin 30 from the free end of the pin 30 and past the inner part of the pin to the portion of the hollow shaft 27 adjacent the pin 30. The latter portion of the hollow shaft 27 is surrounded by an inner circumferential recess 38 in the rotor 22. The bottom of the recess is closed by means of a gasket 39 sealingly abutting both the hollow shaft 27 and the rotor 22.

Openings 39, 40, 41, and 42 are provided opposite the interior of the passage 37 about the pin 30 in the area about the recess 38 in the rotor 22. The openings perforate the wall of the hollow shaft 27 and form thereby an open connection to the interior of the hollow shaft 27 and consequently to the hose 4.

The tubular knife 34 is, at the end abutting the cutting edge 36, internally shaped with a cylindrical portion 43 abutting an area 44 which narrows conically to an inner cylindrical area 45 shaped with an internal thread 46. The outer part of the pin is of a circular cross section and extends substantially parallel to the inner cylindrical area 43 of the tubular knife 34 until the cylindrical area 43 abuts the conical area 44. The outer end of the inner tubular part 31 of the pin 30 is situated at about the same position as the conical area 44. The outer end of the inner tubular part 31 of the pin 30 comprises a conically shaped area 47 of substantially the same axial extent as the inner conical area 44 of the tubular knife 34. The conical area 47 expands inwardly and continues into an inner cylindrical area 48 of almost the same axial extent as the inner cylindrical area 45 on the tubular knife 34. The inner cylindrical area 48 on the pin 30 is shaped with an external thread 49.

The thread 49 on the pin 30 is cut in opposite direction relative to the thread 46 on the inner side of the tubular knife 34.

A plane knife 51 is secured on the outer side of the bearing housing 23 by means of a substantially radially projecting bracket 50. The plane knife 51 extends substantially parallel to the axis of the tubular knife 34 a suitable distance forwards to the vicinity of the cutting edge 36 thereof.

When the apparatus 3 is running, the rotor 22 is caused to rotate by means of the motor 16 through the toothed belt 19, and consequently the tubular knife 34 is also caused to rotate. The pin 30 coaxially arranged inside the tubular knife 34 remains stationary. The free end of the pin projects slightly outside the cutting edge 36 of the knife 34.

A handle 52 is provided for facilitating the handling of the apparatus 3. The handle comprises switches, not shown in greater detail, for the control of the running of the motor 16 and the feeding of vacuum, pressurized air, hot or cold water to the interior of the hollow shaft 27 through the hose 4.

When carrying out the method according to the invention, the apparatus 3 is moved forwards towards the anus of the carcass of the slaughtered animal; vacuum is fed to the hollow shaft 27. The pin is, by means of the mirror 9, inserted in the anus of the carcass, and the tubular knife is moved close to the carcass in such a manner that a vacuum can be established in the interior of the tubular knife.

Subsequently, the tubular knife is caused to rotate, and, as illustrated in FIG. 2, the knife 34 is then moved into the carcass coaxially with the rectum. As a result, the rectum is cut free together with a surrounding fatty layer, the reason why the portion cut free is also referred to as the fatty end. The fatty end is diagrammatically shown at the reference numeral 53 in FIG. 2. While the tubular knife 34 continues to rotate, the fatty end 53 engages the internal thread 46 on the tubular knife 34 with the result that the suction effect of the vacuum is supported. The oppositely cut external thread 49 on the pin ensures an additional retaining and guiding of the inner side of the rectum forwards towards the interior of the apparatus 3. The threads 46 and 49 inside the apparatus 3 ensure together with the narrowed portion of the passage 37 about the pin 30 both a good retaining of the fatty end 53 and an efficient closing of the rectum in such a manner that nothing sieves out of the rectum.

When the fatty end 53 has been cut completely free and is placed in the bottom of the apparatus 3, the apparatus is pulled substantially horizontally forwards towards the ventral side of the carcass. During the latter movement, the ham 14 is cut in two by means of the knife 51. Subsequently, the apparatus is moved downwards, as shown in FIG. 3, until the rectum 54 is positioned immediately above the guide pipe 11, as also shown in FIG. 3. During the movement from the cutting free location and forwards to the area immediately above the guide pipe, the slaughterman must, of course, be very careful to maintain the tubular knife 34 and the pin 30 substantially coaxially with the rectum 54 in such a manner that the rectum or the fatty end 53 is not pressed out into contact with the cutting edge 36 and damaged. Attachments 55 between the rectum 54 and the carcass are torn loose during the pulling out movement.

When the rectum 54 is positioned above the guide pipe 11 in the position shown in FIG. 3, the feeding of vacuum is interrupted to the apparatus and a pressurized air valve is opened for a short period. As a result the fatty end is released from the apparatus 3 and positions itself in such a manner that it hangs downwards over the guide pipe 11 and along the side of the protecting shield 10 facing away from the carcass. Possible escapes of visceral contents flow down the protecting shield and are collected in the drain 12.

While the fatty end 53 is hanging over the guide pipe 11, the carcass can be moved forwards for a cutting free of the remaining intestinal portions without risking escapes of visceral contents coming into contact with the carcass or the slaughterman.

The tubular knife 34 of the apparatus 3 can remain rotating during the movement from the cutting free location to the release location above the guide pipe 11. The retaining is improved by the rotation.

After the cutting free, the apparatus is advanced for sterilization. The interior of the apparatus is sterilized by means of hot and cold water fed through the hose 4.

The apparatus is made of suitable materials easy to clean, and in dimensions conventionally used within the field in question. The internal thread on the tubular knife has, according to a preferred embodiment of the invention, an inner diameter of 44 mm. The external thread 49 on the pin 30 is of an outer diameter of 27 mm. Both threads are trapezoidal with rounded edges and a pitch of 6 mm and a depth of 2 mm. The thread 46 on the tubular knife 34 is left-handed.

The outer cylindrical area 43 on the inner side of the tubular knife 34 has an inner diameter of 56 mm, whereas the outer part of the pin has a diameter of 12 mm. The length of the conical areas 44 and 47 on the tubular knife 34 and the pin 30, respectively, is approximately 40 mm.

The invention has been described with reference to a preferred embodiment. Many modifications can be carried out without thereby deviating from the scope of the invention. The threads may for instance be of other shapes beyond the one described, and the protecting shield with the associated guide pipe and drain may be shaped in another manner.

We claim:

1. A method of cutting free and removing a rectum of a carcass of a slaughtered animal hanging by its hind legs with its head facing downwardly, said method comprising the steps of:
   a) positioning an apparatus including a rotating tubular knife in the vicinity of the rectum of the carcass;
   b) inserting a guiding pin on said apparatus into the rectum of the carcass coaxially with a main axis of the rectum, said guiding pin being coaxial with said rotating tubular knife;
   c) moving said rotating tubular knife into the carcass coaxially with the main axis of the rectum, thereby cutting the rectum free of the carcass;
   d) retaining the rectum in said rotating tubular knife;
   e) pulling the rectum free of the carcass toward a ventral side of the carcass in a direction substantially perpendicular to a main axis of the carcass; and
   f) hanging the rectum downwardly over a side of a protective shield, said side of said shield facing away from the carcass.

2. A method according to claim 1, further comprising the step of cutting the carcass along the ventral side starting from a point adjacent the rectum.

3. A method according to claim 1, further comprising the step of cutting the carcass along the ventral side from a point adjacent where the rotating tubular knife is moved into the carcass, thereby providing an opening which the rectum is pulled through.

4. An apparatus for cutting free and removing a rectum of a carcass of a slaughtered animal, said apparatus comprising:
   a guiding pin for inserting into the rectum of the carcass and guiding the apparatus as the rectum is cut free and removed, a free end of said guiding pin being inserted into the rectum;
   a tubular rotatable knife coaxially surrounding said guiding pin;
   a cutting edge provided on a front edge of said tubular knife;
   means for creating a vacuum suction provided at a rear edge of the tubular knife; and
   at least one thread provided on an inner surface of said tubular knife, said at least one thread engaging the rectum and helping to retain said rectum in said tubular knife.

5. An apparatus according to claim 4, wherein said inner surface of said tubular knife includes a conical transition portion narrowing with increasing distance away from said cutting edge of said tubular knife.

6. An apparatus according to claim 4, wherein an outer surface of said guiding pin includes at least one thread cut in a direction opposite to said at least one thread on an inner surface of said tubular knife, said at least one thread on said guiding pin engaging said rectum and helping to retain said rectum in said tubular knife.

7. An apparatus according to claim 5, wherein an external surface of said guiding pin includes at least one thread arranged in a direction opposite to said at least one thread on said inner surface of said tubular knife, said at least one thread on said guiding pin engaging said rectum and helping to retain said rectum in said tubular knife.

8. An apparatus according to claim 6, wherein said guiding pin includes a conical transition portion expanding with increasing distance away from said free end of said guiding pin and continuing into a cylindrical portion including said at least one thread on said external surface of said guiding pin.

9. An apparatus according to claim 7, wherein said guiding pin includes a conical transition portion expanding with increasing distance away from said free end of said guiding pin and continuing into a cylindrical portion including said at least one thread on said external surface of said guiding pin.

10. An apparatus according to claim 4, further comprising:
   a fixed knife provided outside said tubular knife, said fixed knife automatically cutting the carcass between hind legs of the carcass while the rectum is pulled out of the carcass toward a ventral side of the carcass after being cut free.

11. An apparatus according to claim 5, further comprising:
   a fixed knife provided outside said tubular knife, said fixed knife automatically cutting the carcass between hind legs of the carcass while the rectum is pulled out of the carcass toward a ventral side of the carcass after being cut free.

12. An apparatus according to claim 6, further comprising:
   a fixed knife provided outside said tubular knife, said fixed knife automatically cutting the carcass between hind legs of the carcass while the rectum is pulled out of the carcass toward a ventral side of the carcass after being cut free.

13. An apparatus according to claim 7, further comprising:
   a fixed knife provided outside said tubular knife, said fixed knife automatically cutting the carcass between hind legs of the carcass while the rectum is pulled out of the carcass toward a ventral side of the carcass after being cut free.

14. An apparatus according to claim 8, further comprising:
   a fixed knife provided outside said tubular knife, said fixed knife automatically cutting the carcass between hind legs of the carcass while the rectum is pulled out of the carcass toward a ventral side of the carcass after being cut free.

15. An apparatus according to claim 9, further comprising:
   a fixed knife provided outside said tubular knife, said fixed knife automatically cutting the carcass between hind legs of the carcass while the rectum is pulled out of the carcass toward a ventral side of the carcass after being cut free.

16. An apparatus according to claim 9, wherein said fixed knife is planar and wherein a cutting edge of said fixed knife is perpendicular to said tubular knife.

17. An apparatus according to claim 4, further comprising:
   a shield for preventing fecal matter contained within the rectum from being directed toward the carcass after the rectum has been cut free and removed from the carcass;
   a guide pipe for guiding the rectum toward the shield and for supporting the shield; and
   a drain form receiving the fecal matter in the rectum.

18. An apparatus according to claim 4, wherein said guiding pin is stationary with respect to said rotating knife.

* * * * *